May 17, 1949. J. M. ROTH 2,470,372

BALL TYPE PRESSURE RELIEF VALVE

Filed July 17, 1944

Inventor:
Jay M. Roth

Patented May 17, 1949

2,470,372

UNITED STATES PATENT OFFICE 2,470,372

BALL TYPE PRESSURE RELIEF VALVE

Jay M. Roth, Euclid, Ohio, assignor, by mesne assignments, to Borg-Warner Corporation, Chicago, Ill., a corporation of Illinois Application July 17, 1944, Serial No. 545,254

1 Claim. (Cl. 137—53)

The present invention relates to a relief valve and more particularly to a pressure type of valve which employs a ball as a valve body.

It is one of the principal objects of this invention to simplify the construction of a pressure relief valve such as contemplated herein and to improve the efficiency, operation and dependability of such relief valve.

It is also a principal object of this invention to provide an effective retainer on the ball of a relief valve whereby the ball is prevented from rolling off its seat. The arrangement contemplated herein also tends to prevent chatter of the parts of the valve when it is being operated.

Another object of this invention is to provide a retainer for the ball of a relief valve, such retainer being arranged so that a spring pressing thereon will engage the retainer at a point below the center of the ball.

A further object of this invention is to provide a ball type relief valve wherein the pressure exerted by the spring against the ball is outwardly of the ball and below the center thereof to effect stable equilibrium of the ball. This arrangement is such that a coiled spring of larger diameter than the ball may be used and thus provide a guide for the ball.

Still another object of this invention is to provide means in a pressure relief valve whereby to reverse the direction of flow past the ball.

Additional objects, aims and advantages of this invention will be apparent to persons skilled in the art after the construction and operation of the pressure relief valve is understood from the within description.

It is preferred to accomplish the numerous objects of this invention and to practice the same in substantially the manner hereinafter fully described and as more particularly pointed out in the appended claim. Reference is now made to the accompanying drawings that form a part hereof and wherein:

The drawings are to be understood as being more or less of a schematic character for the purpose of disclosing typical or preferred forms of the improvements contemplated herein. In these drawings, like reference characters identify the same parts in the different views.

Figure 1:
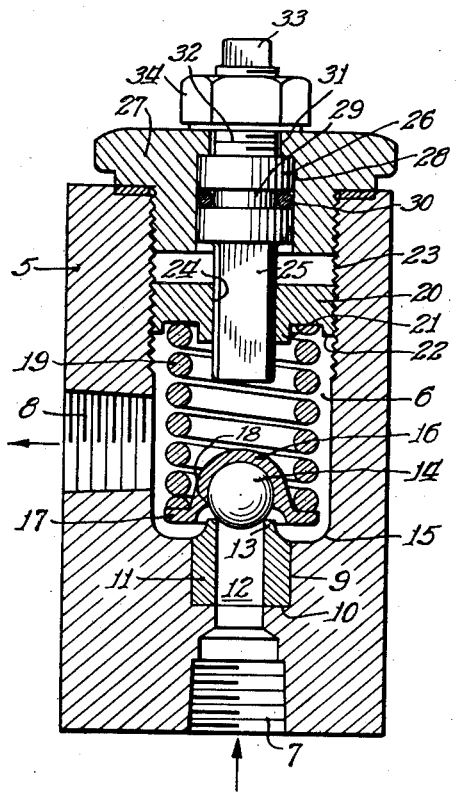
Fig. 1 is a vertical axial section of a valve of the pressure relief type showing the instrumentalities of the present invention.

The pressure relief valve contemplated herein comprises a suitably shaped body 5 having a wide cylindrical bore therein to provide a valve chamber 6 that communicates with the inlet port 7 and the outlet port 8. The inlet port 7 is disposed axially of the chamber 6 and between the inlet port 7 and said chamber there is an intermediate bore 9 of less diameter than the chamber to provide a shoulder 10 upon which a valve block 11 is disposed. This valve block has an axial passage way 12 through it and the upper portion of the block has an upstanding circular flange 13 surrounding the bore and providing an annular seat for the valve ball 14. The lower portion of the valve chamber 6 has its wall curved concavely inwardly as at 15, the purpose of which will later be explained.

In the check valves of this character the balls have a tendency to roll off their seats during frequent operation thereof and this rolling action usually wears away the seat at different locations resulting in a defective seal and it frequently causes the valve to chatter during operation. In order to eliminate the tendency of the ball to roll off the seat means are provided for preventing lateral movement of the ball with respect to the seat. To accomplish this purpose the ball is provided with a bonnet having a dome-shaped portion 16 of concave-convex cross section and an annular flange or rim 17. This bonnet is adapted to perform the function of a retainer and guide for the ball 14.

The interior surface of the dome-shaped portion 16 of the bonnet conforms substantially with the surface of the ball 14 so that the latter fits snugly therein. After the ball has been placed in the dome-shaped portion 16 the bonnet is crimped as at 18 in a manner so that the crimping extends around the ball at a location below the center thereof. Also it will be seen that more than half the circumference of the ball is encompassed by the dome-shaped portion 16 of the retainer. As seen in Fig. 1, the flange or rim 17 of the retainer is in a plane that is also below the center of the ball. The ball 14 is urged normally toward its seat by a coiled compression spring 19 the lower end of which is bottomed on the flange or rim 17 of the retainer. This spring 19 has a larger diameter than the ball or the domed portion 16 of the retainer so that its force is exerted annularly around the ball in a plane below the center thereof. Thus a stabilizing effect is imparted to the ball at all times which prevents the ball rolling off its seat.

The upper end of the spring 19 is engaged with adjustable stop means which includes a follower disc 20 having thereon a central annular boss 21 and an outer annular downturned lip 22. The boss and lip provide an annular channel between them for seating the upper end of the spring 19. For effecting adjustment, the follower 20 has a threaded cylindrical edge that screws into the threaded portion 23 of the chamber 6 and said follower has a central aperture 24 of angular cross section to receive a stud or spindle 25 of corresponding angular cross section. This stud or spindle 25 is freely movable through the angular opening 24 in the follower and it is a part of a cylindrical head 26 that is arranged to rotate in the bore of a large cap nut 27 screwed into and closing the upper end of the valve chamber 6.

This closure cap nut 27 has a cylindrical recess 28 bored axially therein to receive the head 26 and the head is provided with an annular channel 29 in which a seal ring 30 is seated. The diameter of recess 28 is reduced as at 31 so that the recess extends through the top of closure cap nut as shown. The head or boss 26 has a threaded upstanding extension 32 that passes freely through the reduced portion 31, and the outer end of this extension 32 is formed of rectangular cross section as at 33 for receiving a wrench when it is desired to rotate the same. A locknut 34 is screwed onto the threaded portion of the extension 32 to clamp against the outer surface of the closure cap nut thereby locking these parts against rotation. The arrangement just described provides means for readily adjusting the tension of the compression spring 19. This is done by backing up the locknut 34 and then rotating the extension 32, which in turn rotates the spindle 25 and the follower 20 is moved up or down by reason of its threaded engagement with the upper portion of the chamber 6.

Figure 2:
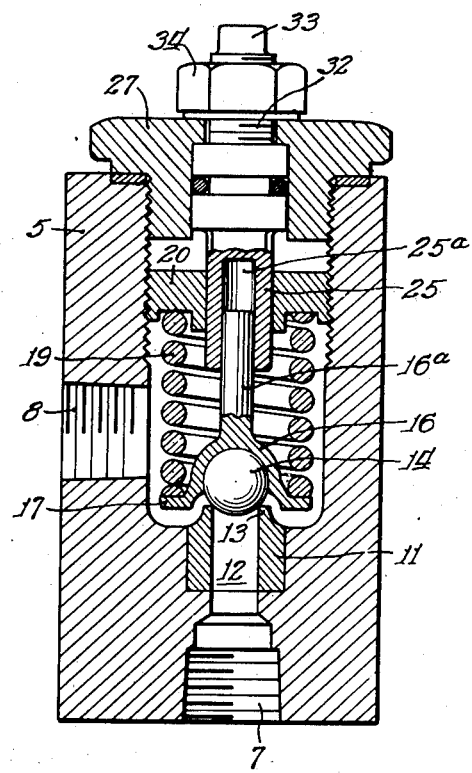
Fig. 2 is a section similar to Fig. 1 showing a modified form of the improvements.

In the modified structure shown in Fig. 2 the rectangular spindle 25 has an axial bore 25a to receive a small stem 16a arising from the upper portion or top of the dome-shaped portion 16 of the bonnet or retainer. This arrangement further prevents any tendency of the valve to chatter by reason of the fact that the slight clearance between small spindle 16a and the bore 25a in which it operates provides a dash pot effect.

The arrangement of the retainer and ball in both types of valves shown herein is such that the effort of the spring is exerted in a plane below the center of the ball and outside the circumference thereof. Since the action of the fluid on the ball when the valve is open will have the same effect as a force acting on the center of the ball then, with the spring support below the center of the ball, the valve will be in stable equilibrium. Another function of this arrangement is that the retainer flange or rim 17 serves to reverse the direction of flow completely, instead of letting the flow go past the valve in the usual somewhat straight path. This results in additional impact effect on the valve, and the contour of the outer surface of the valve seat 13 and the curved lower surface 16 of the chamber permit the easy flow of the fluid past the valve in the reversed direction when the valve is unseated.

While this invention has been described in detail in certain of its present forms or embodiments, it will be apparent to persons skilled in the art, after understanding the improvements, that various changes and modifications may be made therein without departing from the spirit or scope thereof. It is aimed in the appended claim to cover all such changes and modifications.

I claim:

A pressure relief valve comprising a hollow housing defining a central chamber with a threaded open end and an outlet port; an inlet port in said chamber opposite said threaded end; a valve seat at the inner end of said inlet port; a valve ball normally engaged on said seat; a retainer having a stem and a frusto-spherical hollow boss surrounding the major portion of said ball and extending below the center thereof with its lower portion in-turned against said ball to anchor said ball to said retainer; an annular rim at said lower portion of said retainer; a follower adjustably mounted in the threaded portion of said chamber; a spring interposed between said follower and rim for yieldably urging said retainer in a direction to seat said ball; an apertured closure in the open end of said chamber; and follower adjusting means in said closure aperture, having a bore in which said retainer stem is guided whereby the tension of said spring is adjustable independently of and without disturbing said valve ball and retainer.

JAY M. ROTH.

REFERENCES CITED

The following references are of record in the file of this patent:

UNITED STATES PATENTS

| Number | Name | Date |
| --- | --- | --- |
| 272,040 | Graham | Feb. 13, 1883 |
| 1,698,956 | McAneny | Jan. 15, 1929 |
| 1,701,305 | Meyers | Feb. 5, 1929 |
| 1,906,052 | Fina | Apr. 25, 1933 |
| 2,042,216 | Edwards | May 26, 1936 |

FOREIGN PATENTS

| Number | Country | Date |
| --- | --- | --- |
| 17,950 | Great Britain | Sept. 21, 1894 |
| 485,141 | Great Britain | May 16, 1938 |
| 540,730 | Great Britain | Oct. 28, 1941 |
| 542,274 | Great Britain | Jan. 1, 1942 |